(12) United States Patent
Coughlin, Jr. et al.

(10) Patent No.: US 7,664,245 B2
(45) Date of Patent: Feb. 16, 2010

(54) SYSTEM AND METHOD FOR PROVISIONING DIGITAL PHONE SERVICE

(75) Inventors: Robert W. Coughlin, Jr., Cary, NC (US); Donald G. Monteyne, Wayne, NJ (US); Renee K. Downs Storosh, Fairfax, VA (US); John Pfaff, Sea Bright, NY (US); Lori L. Mays, Leesburg, VA (US); Robert Michael Glass, Ashburn, VA (US)

(73) Assignee: Time Warner Cable, Inc., New York, NY (US)

( * ) Notice: Subject to any disclaimer, the term of this patent is extended or adjusted under 35 U.S.C. 154(b) by 1048 days.

(21) Appl. No.: 11/021,530

(22) Filed: Dec. 23, 2004

(65) Prior Publication Data

US 2005/0169449 A1 Aug. 4, 2005

Related U.S. Application Data

(60) Provisional application No. 60/532,445, filed on Dec. 24, 2003.

(51) Int. Cl.
*H04M 3/42* (2006.01)
*H04M 15/00* (2006.01)

(52) U.S. Cl. .................. 379/201.12; 379/114.28; 379/121.01; 379/201.01

(58) Field of Classification Search ..................
379/201.01–201.06, 93.12, 201.12, 201.13, 379/15.03, 121.01
See application file for complete search history.

(56) References Cited

U.S. PATENT DOCUMENTS

| | | | | |
|---|---|---|---|---|
| 6,085,171 A * | 7/2000 | Leonard | ...................... | 705/26 |
| 6,304,647 B1 * | 10/2001 | Frost | ..................... | 379/201.12 |
| 6,366,657 B1 * | 4/2002 | Yagel et al. | ............ | 379/201.03 |
| 6,546,094 B1 * | 4/2003 | Turner et al. | ........... | 379/201.12 |
| 6,735,293 B2 * | 5/2004 | Doherty et al. | ........ | 379/201.12 |
| 6,813,278 B1 * | 11/2004 | Swartz et al. | ............... | 370/466 |
| 6,845,909 B2 * | 1/2005 | Bong et al. | .................. | 235/385 |
| 7,039,041 B2 * | 5/2006 | Robohm et al. | ............. | 370/352 |
| 7,046,659 B1 * | 5/2006 | Woundy | ..................... | 370/352 |
| 7,464,046 B2 * | 12/2008 | Wilson et al. | ................... | 705/9 |
| 7,483,689 B2 * | 1/2009 | Hutcheson et al. | .......... | 455/405 |
| 2002/0168054 A1 * | 11/2002 | Klos et al. | ................ | 379/1.04 |
| 2004/0240653 A1 * | 12/2004 | Ramian | ................. | 379/201.02 |

* cited by examiner

*Primary Examiner*—Fan Tsang
*Assistant Examiner*—Solomon Bezuayehu
(74) *Attorney, Agent, or Firm*—The Marbury Law

(57) ABSTRACT

A system and method uses a digital phone order management (DPOM) system to manage the ordering and provisioning of digital telephone services in a cable system. A centralized datastore of customer, order, telephone number inventory and provisioning information is accessible to access devices used by a customer service representative (CSR) of a cable operator, a voice provisioning specialist (VPS) of a local exchange carrier (CLEC), and a cable operator installation technician to schedule and provision based on permissions granted by an administrator. The sharing of information allows a CSR to manage orders for digital telephone services and to coordinate installation and provisioning so as to reduce the time to complete an order and use installation resources efficiently.

24 Claims, 5 Drawing Sheets

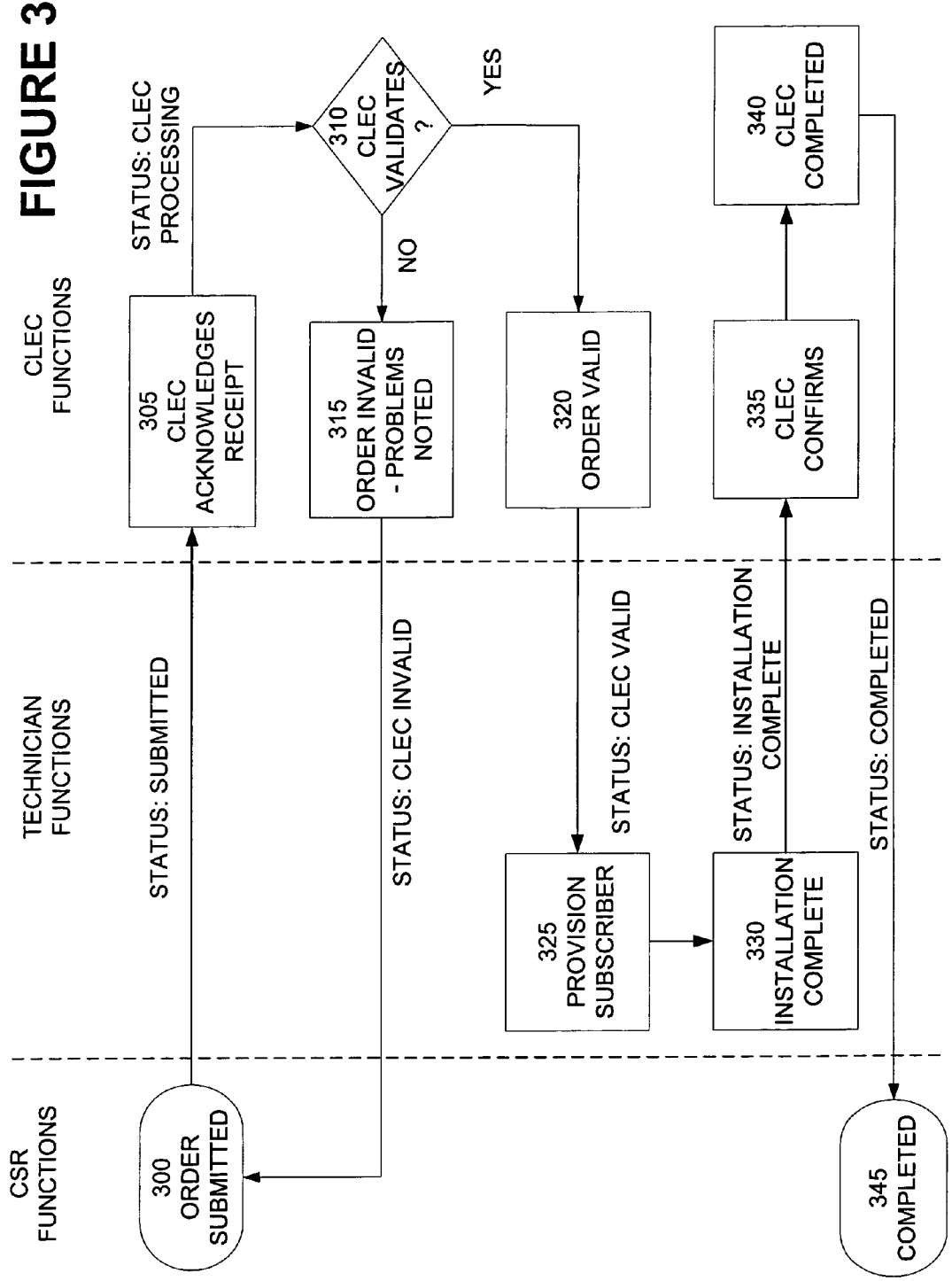

SYSTEM AND METHOD FOR PROVISIONING DIGITAL PHONE SERVICE

CROSS REFERENCE TO RELATED APPLICATIONS

This application claims priority under 35 U.S.C. § 119(e) from provisional application No. 60/532,445 filed Dec. 24, 2003. The 60/532,445 provisional application is incorporated by reference herein, in its entirety, for all purposes.

BACKGROUND

The present invention relates in general to provisioning telephone services over an IP network. More specifically, present invention relates to a provisioning system for voice over Internet protocol (VoIP) services in a customer care environment.

The increasing popularity of high-speed data (HSD) service over cable presents a significant challenge to cable operators to provision customers with the HSD services they desire. Revenue opportunities in the cable industry have evolved along multiple paths as cable-based services and supporting technologies have matured. Video services have evolved from analog and digital video to advanced video services including interactive TV and video-on-demand (VOD). In the past, a few companies dominated HSD services with multiple system operators (MSOs) providing local distribution. Many cable companies are now moving aggressively to provide their own internal HSD networks, including access to multiple Internet service providers (ISPs). Cable telephony is progressing from secondary and primary line service using circuit-switched technologies to a full range of VoIP-based telephony services, offering custom features and advanced intelligent network services that rival, and in many aspects exceed, those offered by the incumbent local exchange carriers (ILECs).

Typically, cable operators have maintained separate work centers, support systems and skilled technicians for video, HSD and, more recently, telephony. New services have been introduced over time, often with separate back office ordering, billing, dispatch and provisioning platforms. However, the convergence of these services within an IP-based environment makes this operational model inefficient and ineffective. One catalyst for changing this model is the increasing popularity of VoIP telephony, which shares common IP network infrastructure and customer premises equipment with high-speed data services.

With the passage of the Telecommunications Act ("the Act") of 1996, an incumbent local exchange carrier (ILEC), the regulated entity that owns and administers an existing access network must provide to a requesting telecommunications carrier (the "competitive local exchange carrier" or "CLEC") nondiscriminatory access to network elements on an unbundled basis and allow CLECs to combine such network elements in order to provide telecommunications service. ILECs also have a duty to provide to CLECs interconnection with their network for the transmission and routing of telephone exchange service and exchange access. The interconnection contemplated by the Act provides nondiscriminatory access or interconnection to such services or information as are necessary to allow the requesting CLEC to implement local dialing parity, including nondiscriminatory access to telephone numbers, operator service, directory assistance, and directory listing, with no unreasonable dialing delays.

The provisions of the Act have demonstrated a need for competing exchange carriers to be interconnected so that customers can seamlessly receive calls that originate on another carrier's network and place calls that terminate on another's carrier's network without performing additional activities, such as dialing extra digits, etc. A cable provider desiring to provide VoIP services directly to customers either acts as a CLEC or partners with a CLEC.

In the circuit switched environment, the ILEC receives a local service request (LSR) from a CLEC providing service to a customer. The LSR provides detailed data regarding the customer, the CLEC (if applicable) and the services desired by the customer.

Circuit-switched and VoIP telephony back office operations for primary line service may require several days of preparation prior to, during, and after the day of install, including:

Communications with the customer's ILEC;
Preparation and implementation of directory listing and directory assistance records;
Preparation and implementation of the E911 record;
Preparation and implementation of the line information database record;
Preparation and transmittal of the Customer Account Record Exchange (CARE) record to the interexchange carrier;
Calling number update to the calling number database;
Provisioning of customer line(s) and associated features in the cable operator's circuit switch or softswitch; and
Porting of the customer's existing telephone number from the existing local exchange carrier to the cable operator's circuit switch or softswitch (also referred to as a media gateway controller).

A softswitch is a device that is used to bridge a traditional PSTN and VoIP by linking PSTN to IP networks and managing traffic that contains a mixture of voice, fax, data and video. Softswitches are able to process signaling for a number of packet protocols.

Portability refers to whether a telephone number (TN) assigned by a local exchange carrier (referred to as the "donor network") can be used by a customer who moves to a different local exchange carrier. TNs are assigned from a number range assigned to the donor network. The current service provider (new SP), or new serving network, is the network that currently serves the ported number. The old serving network (or old SP) is the network that previously served the ported number before the number was ported to the new serving network. Since a TN can port a number of times, the old SP is not necessarily the same as the donor network, except for the first time the TN ports away, or when the TN ports back into the donor network and away again.

The process of interacting with the ILEC often results in delays in processing VoIP service orders and results in multiple service calls to a customer's location. Typically, during an initial service appointment, the cable modem is installed leaving the customer with dial tone for outgoing calls only. So, even if the customer had dial tone after the first visit, the customer would not have services such as 911 support; directory list service, and long distance service. After the completion of the ILEC process, a second service appointment is scheduled to finalize the provisioning of the VoIP phone service.

In a typical cable environment, the provisioning of VoIP requires that a prospective VoIP customer be an HSD customer. If the prospective VoIP customer is not a current HSD customer, but wants to become one, an order for cable HSD service must be written. Additionally, the VoIP order cannot yet be processed until the potential VoIP customer is in the customer database. In many systems, this data is acquired from the billing system once a day. The billing system data is "dumped" to a customer database through a one-way interface. This process generally precludes flow through provisioning of VoIP service in coordination with ILECs and internal cable system entities and precludes customer self-provisioning and on-demand services.

What is needed is a provisioning system that enables rapid deployment of new products and services. Such a provision system would contain a single integration point to support changes to back office systems, have a standardized highly available architecture to support all provisioning, provide flow through provisioning to eliminate account updates via batch files, scale to meet the growth of the business, and minimize direct CSR interaction.

SUMMARY

In an embodiment of the present invention, a digital phone order management (DPOM) system manages the ordering and provisioning of digital telephone services in a cable system. In this embodiment, a centralized datastore of customer, order, telephone number inventory and provisioning information is accessible to access devices used by a customer service representative (CSR) of a cable operator, a voice provisioning specialist (VPS) of a local exchange carrier (CLEC), and a cable operator installation technician to schedule and provision based on permissions granted by an administrator. The sharing of information allows a CSR to manage orders for VoIP services and to coordinate installation and provisioning so as to reduce the time to complete an order and to use installation resources efficiently.

It is an aspect of the present invention to implement systems and methods that permit a CSR of a cable operator to:
Create new, change, cancel, disconnect, or port out VoIP order requests.
Provide a telephone number at the time of call.
Corrdinate due date (installation date) with the CLEC.
Pass LSR information to a CLEC for E911, 411, PIC, and PSTN provisioning.
Activate cable modem for HSD, voice, or both.
Provision call management server (softswitch) to enable dial tone on a customer media terminal adapter (MTA).
Provision a voice mail server.
Pass customer data to a rating engine for online usage reports and billing.
Manage telephone number inventory in compliance with FCC telephone number conservation regulations.

It is another aspect of the present invention to share VoIP service ordering information among CSRs, VPSs, and installation technicians.

It is yet another aspect of the present invention to create a single installation appointment for the installation and provisioning of all services needed to provide VoIP service to a customer location.

It is still another aspect of the present invention to provision the softswitch of the VoIP provider from the installation record of the customer.

It is yet another aspect of the present invention to provide telephone number portability verification.

It is another aspect of the present invention to administer telephone numbers in full compliance with public utility commission (PUC) and Federal Communication Commission (FCC) requirements.

In an embodiment of the present invention, a digital phone order management (DPOM) system comprises a user interface, a customer order entry module, and an order management module. The user interface provides access to the DPOM system to a customer service representative (CSR) user via a CSR user access device, provides access to the DPOM system to a competitive local exchange carrier (CLEC) user via a CLEC user access device, and provides access to the DPOM system to an installation technician user via an installation technician user access device. The customer order entry module receives a customer order for digital phone service from a customer of a cable system operator. The order management module receives the customer order from the customer order entry module, associates a customer order status with the customer order, and grants access to the customer order to a user based on the order status and permissions granted the user.

In another embodiment of the present invention, the order entry module determines whether the customer is receiving high speed data (HSD) service from the cable system operator. If the customer is not receiving HSD service, the order entry module determines whether the customer desires HSD service. If the customer desires HSD service, then the order entry module enters the order for HSD service and digital phone service for the customer.

In yet another embodiment of the present invention, the order entry module receives a telephone number associated with the customer and determines whether the telephone number is portable. If the telephone number is portable, an order entry module ports the telephone number to the digital phone service. If the telephone number is not portable, the order entry module assigns the customer a new telephone number.

In another embodiment of the present invention, the order entry module receives customer information relating to the customer from an incumbent billing system. The order entry module evaluates the customer information in view of the customer order and identifies customer premises equipment (CPE) to be installed at a customer location. In an exemplary embodiment of the present invention, the CPE comprises a media terminal adapter. In another embodiment of the present invention, the CPE comprises a cable modem and a media terminal adapter.

In still another embodiment of the present invention, the order management module receives a cancellation request to a pending customer order. The order management module determines whether the customer order status reflects completion of installation of the CPE. If the customer order status reflects completion of the CPE, the order management module rejects the cancellation request. If the customer order status does not reflect completion of the CPE, then the order management module submits the cancellation request to the CLEC user via the CLEC user access device, receives confirmation from the ILEC user that the cancellation request is confirmed, changes the customer order status to reflect cancellation of the customer order, determines whether the softswitch comprises a record associated with the cancelled customer order, and, if the softswitch comprises the record associated with the cancelled customer order, changes the record to reflect cancellation of the customer order.

In an embodiment of the present invention, the order entry module receives customer information relating to the customer from an incumbent billing system and evaluates the customer information in view of the customer order. The order entry module assigns the customer order to a rate center for fulfillment of the customer order.

In another embodiment of the present invention, the DPOM further comprises a hardware configuration module. The hardware configuration module receives a MAC address of a media terminal adapter associated with the customer, and configures a softswitch with the MAC address of the media terminal adapter to provide digital telephone service to the customer.

In another embodiment of the present invention, the order management module receives a request to change an existing telephone number associated with the customer. The order management module creates a first order to disconnect the existing telephone number and a second order to connect a new telephone number. The order management module sends the first and second orders to the CLEC user via the CLEC user access device. The order management module receives from the CLEC validation of the first and second orders, and updates a softswitch to associate the new number with the customer.

In an embodiment of the present invention, the customer order status is indicative of an order that is submitted from the customer order entry module and access to the customer order is granted to the CLEC user. In yet another embodiment of the present invention, the order management module receives a customer order validation notice from the CLEC user. In this embodiment, the customer order status is indicative of validation of the customer order by the CLEC user and access to the customer order is granted to the installation technician user. In still another embodiment of the present invention, the order management module receives a customer order installation complete notice from the installation technician user. In this embodiment, the customer order status is indicative of the completion of installation of customer premises equipment at a location associated with the customer and access to the customer order is granted to the CLEC user.

In an embodiment of the present invention, the order management receives a customer order complete notice from the CLEC user, and the customer order status is indicative of successful testing of the digital telephone service.

An embodiment of the present invention provides a method for managing orders for digital telephone service. A customer order for digital telephone service for a customer is received from a customer order entry module. The customer order is processed. A customer order status is associated with the customer order. Access to the customer order is granted to a user based on the order status and permissions granted the user. In an embodiment of the present invention, processing the customer order is accomplished by making a determination whether the customer is receiving high speed data (HSD) service from the cable system operator. If the customer is not receiving HSD service, a determination is made whether the customer desires to obtain HSD service from the cable system operator. If the customer desires to obtain HSD service from the cable system operator, then the order for both digital telephone service and HSD service is entered.

In another embodiment of the present invention, processing the order is accomplished by receiving a telephone number associated with the customer and making a determination whether the telephone number is portable. If the telephone number is portable, the telephone number is ported to the digital phone service. If the telephone number is not portable, the customer is assigned a new telephone number.

In yet another embodiment of the present invention, processing the order is accomplished by receiving customer information relating to the customer from an incumbent billing system and evaluating the customer information in view of the customer order. The customer premises equipment (CPE) to be installed at a customer location is identified.

In an embodiment of the present invention, the method further comprises receiving a cancellation request to a pending customer order. A determination is made whether the customer order status reflects completion of installation of the CPE. If the customer order status reflects completion of the CPE, then the cancellation request is rejected. If the customer order status does not reflect completion of the CPE, then the cancellation request is submitted to a CLEC user via the CLEC user access device. Confirmation is received from the CLEC user that the cancellation request is confirmed. The customer order status is changed to reflect cancellation of the customer order. A determination is made whether the softswitch comprises a record associated with the cancelled customer order. If the softswitch comprises the record associated with the cancelled customer order, the record is changed to reflect cancellation of the customer order.

DESCRIPTION OF THE DRAWINGS

FIG. 3 illustrates a flow of information among the users of a DPOM system according to an embodiment of the present invention.

DETAILED DESCRIPTION

The following definitions are provided for the purpose of clarity:
CLEC—Competitive local exchange carrier.
CNAM—Calling Name (or "Caller IDS") is the information that identifies the calling party and is displayed on a telephone subscribing to caller ID service.
CSR—Customer service representative of a cable network operator.
DPOM system—Digital phone order management system.
HSD—High-speed data.
ILEC—Incumbent local exchange carrier.
LIDB—Line information database that contains subscriber information such as a service profile, 10-digit line numbers, service provider ID, equipment indicator, and billing specifications.
LSR—local (or line) service request.
MAC—Media access control. A MAC address is a unique identifier associated with a network-addressable device.
MSAG—Mater street address guide.
MTA—Media terminal adapter.
PIC—Primary inter-exchange carrier.
PSTN—Public switched telephone network.
SP—Service provider.
TN—Telephone number.
Trading partner—A supplier of a CLEC responsible for providing some aspect of the service to the subscriber.
VoIP—Voice over Internet Protocol.

In an embodiment of the present invention, a digital phone order management (DPOM) system manages the ordering and provisioning of VoIP services in a cable system. In this embodiment, a centralized datastore of customer, order, telephone number inventory and provisioning information is accessible to access devices used by a customer service representative (CSR) of a cable operator, a voice provisioning specialist (VPS) of a local exchange carrier (CLEC), and a cable operator installation technician to schedule and provision based on permissions granted by an administrator. The sharing of information allows a CSR to manage orders for VoIP services and to coordinate installation and provisioning so as to reduce the time to complete an order and to use installation resources efficiently.

Figure 1:
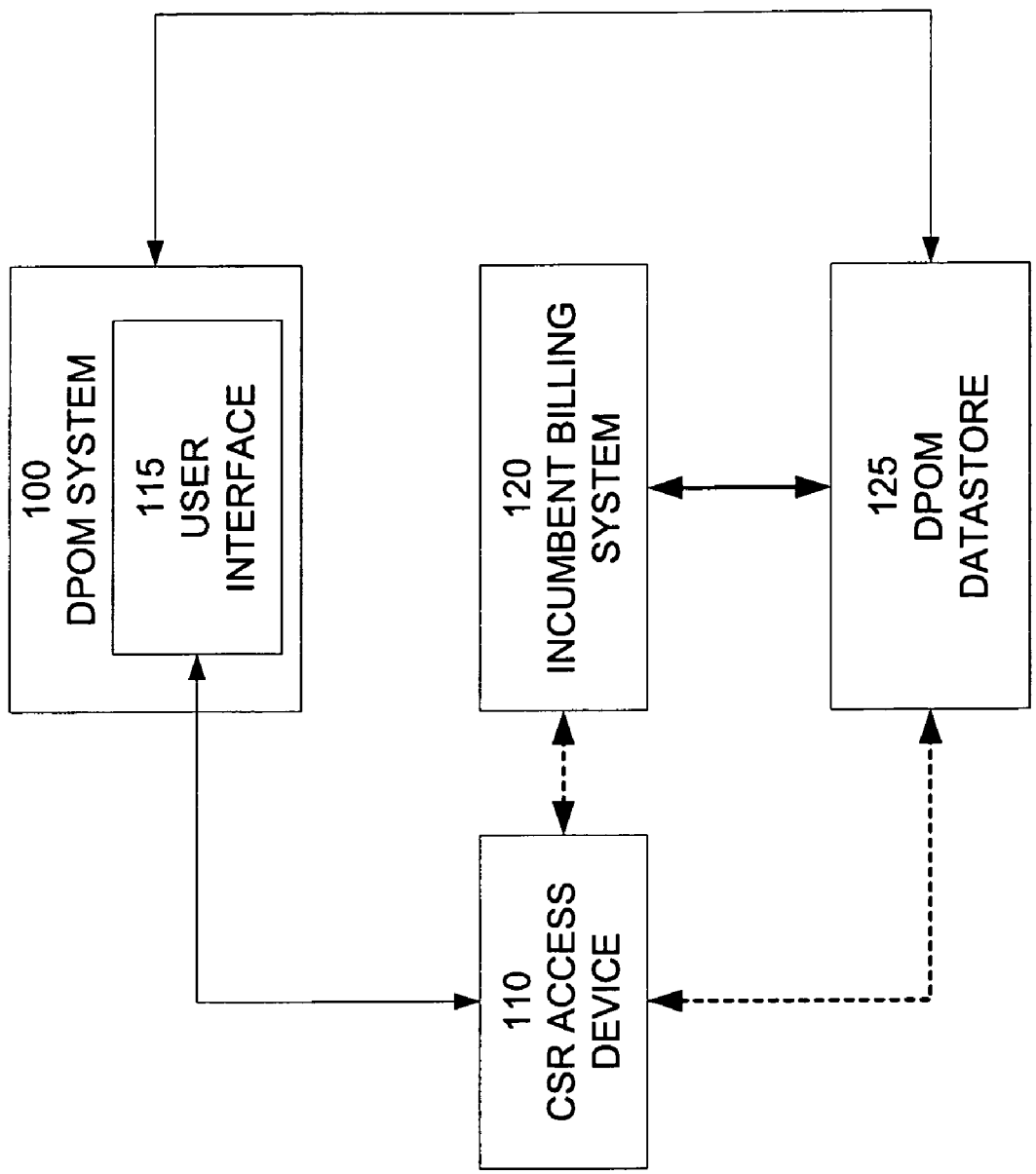
FIG. 1 illustrates a block diagram of a high-level view of a CSR interface to a digital phone order management (DPOM) system according to an embodiment of the present invention.

FIG. 1 illustrates a block diagram of a high-level view of a CSR interface to a digital phone order management (DPOM) system according to an embodiment of the present invention. Referring to FIG. 1, a DPOM system 100 comprises a user interface 115 that is accessible to a CSR access device 110. In an embodiment of the present invention, user interface 115 comprises a secure, Internet accessible interface. DPOM system 100 has access to an incumbent billing system 120 and a DPOM datastore 125. CSR access device 110 may also access incumbent billing system 120 and a DPOM datastore 125 (as indicated by the dotted line) subject to permissions granted to the user (not illustrated) of CSR access device 110. Permissions granted to a user range from read only certain data fields (e.g., for reporting purposes) to full access to read, and write to, all data fields.

DPOM 100 manages the provisioning of VoIP services by providing a CSR user (not illustrated) means to access and acquire all of the information needed to complete a digital phone service order before a service appointment is scheduled and to obtain elements of the digital phone service from a CLEC. DPOM datastore 125 stores customer data. One element of customer data is whether the prospective VoIP customer is an HSD customer. In an embodiment of the present invention, if the prospective VoIP service customer is not an HSD customer, the DPOM 100 provides the CSR user (not illustrated) the means to coordinate the installation and provisioning of the VoIP services with the HSD services for customers desiring both services.

The DPOM 100 also receives input from a CLEC access device (see 255, FIG. 2) and an installation technician access device (see 214, FIG. 2) and provides these responses to CSR access device 110.

In an embodiment of the present invention, the DPOM datastore 125 receives customer information from the incumbent billing system 120. The customer information is then used to determine what a prospective VoIP customer requires in terms of installation services and equipment. In another embodiment of the present invention, the CSR access device 110 accesses the incumbent billing system in real time and can read from and write to the incumbent billing system.

Figure 2:
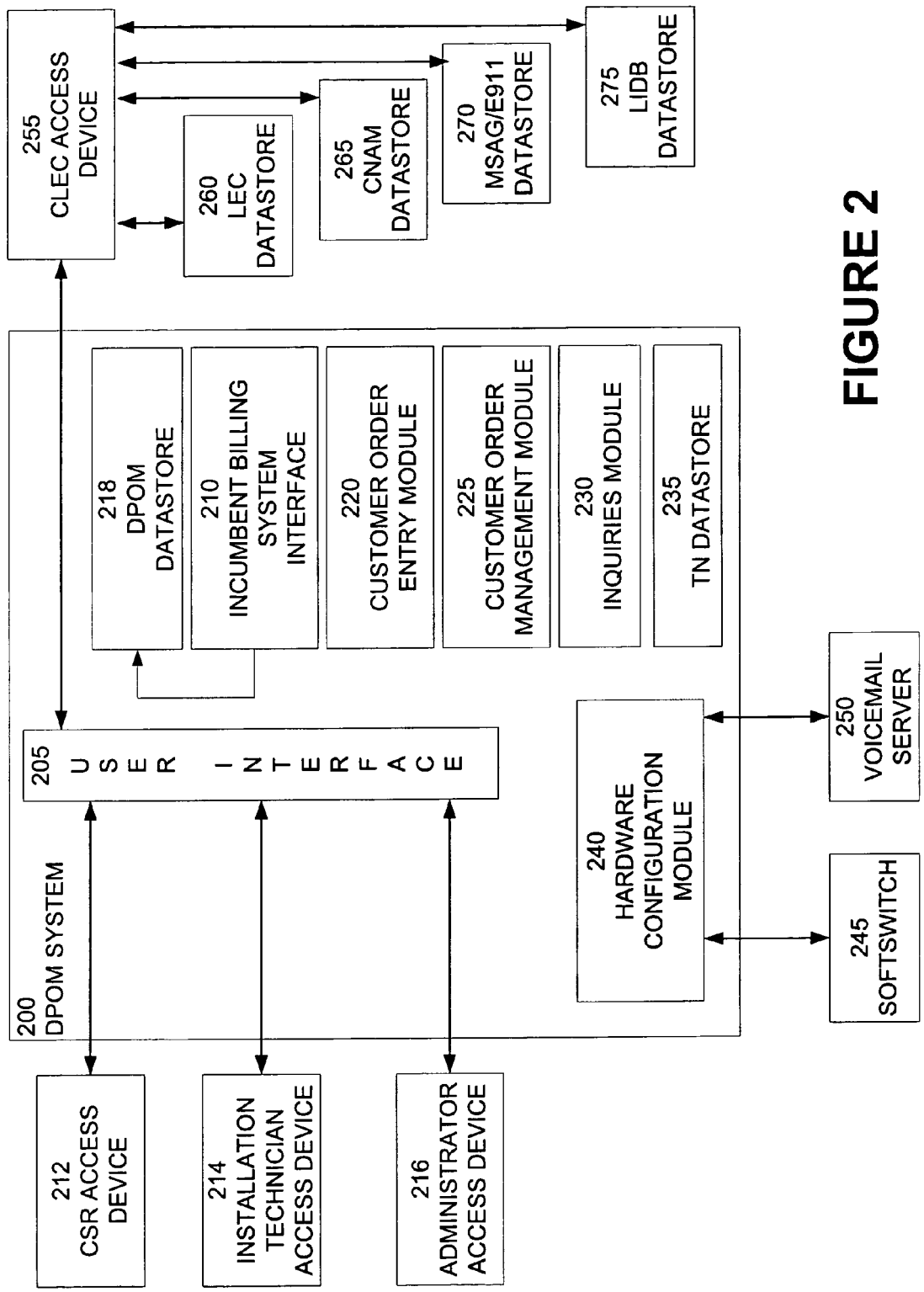
FIG. 2 illustrates a block diagram of the logical components of a DPOM system and associated components according to an embodiment of the present invention.

FIG. 2 illustrates a block diagram of the logical components of a DPOM system and associated components according to an embodiment of the present invention. Referring to FIG. 2, a DPOM system 200 comprises a user interface 205, an incumbent billing system interface 210, a DPOM datastore 218, a customer order entry module 220, a customer order management module 225, an inquiries module 230, a telephone number (TN) datastore 235, and a hardware configuration module 240. A CSR access device 212, an installation technician access device 216, an administrator access device 216, and CLEC access device 255 interact with DPOM system 200 and each other through user interface 205. Incumbent billing system interface 210 allows DPOM datastore 218 to exchange customer information with an incumbent billing system (see FIG. 1, 120).

The configuration and administration of DPOM system 200 is controlled through administrator access device 216. User interface 205 permits an administrator-user to authorize other users to access the DPOM system 200, to establish the permissions granted those users, and to revoke access rights to a user.

Customer order entry module 220 and customer order management module 225 provide users with appropriate permissions to perform tasks relating to the processing of VoIP customers. By way of illustration and not as a limitation, an authorized user may Add new VoIP service customer
    Disconnect VoIP service customer
    Reschedule VoIP service customer
    Change features
    Change the primary inter-exchange carrier (PIC)
    Change a customer name
    Change a telephone number
    Add/modify a media access control (MAC) address
    Disconnect a MAC address and terminate telephone service In an embodiment of the present invention, the customer processing functions are generally accessible to CSRs and their managers and to the DPOM system 200 administrator. Installation personnel may make changes to a scheduled installation appointment. Installation personnel and softswitch administrators may also access processing functions related to MAC addresses.

In an embodiment of the present invention, service codes and account information are entered into an incumbent billing system (not illustrated). The service codes and account information stored in the incumbent billing system enable the customer's MTA to talk to softswitch 245 and to receive dial tone for the digital phone service. Customer related information stored in the incumbent billing system is also stored in the DPOM datastore 218. In this embodiment, before an order is created for digital phone service, a customer's account information is loaded from the incumbent billing system into the DPOM datastore 218 via the incumbent billing system interface 210. In an embodiment of the present invention, the DPOM datastore 218 is updated nightly with new and updated customer information from the billing system database. In addition, the subscriber data file is processed to assign a rate center to the account. The rate center determines phone number assignment for customers who want a new telephone number (instead of porting a previously assigned phone number).

The DPOM system 200 supports the capability of changing the due date of a pending order. The request for changing the order's due date typically is based on a request by the customer or scheduled by an installation technician. The DPOM system 200 function is only used when a pending order exists. Since rescheduling a pending order only impacts one order record, the DPOM system 200 allows the user to search for the order record that requires rescheduling. The record can be found by locating the customer associated with the order.

The DPOM system 200 supports the capability of changing the calling features for a customer. According to an embodiment of the present invention, if the customer has a pending order, no changes will be allowed until the order is completed. The DPOM system 200 will create a new purchase order number (PON). The request for changing the features typically is based on a request by the customer. Since rescheduling a pending order only impacts one order record, the DPOM system 200 allows the user to search for the order record that requires rescheduling. The record can be found by locating the customer associated with the order.

The DPOM system 200 supports the capability of changing the primary inter-exchange carrier (PIC) information for a customer. According to an embodiment of the present invention, if the customer has a pending order, no changes will be allowed until the order is completed. The DPOM system 200 will create a new PON. The request for changing the PIC typically is based on a request by the customer. Since rescheduling a pending order only impacts one order record, the DPOM system 200 allows the user to search for the order record that requires rescheduling. The record can be found by locating the customer associated with the order.

The DPOM system 200 supports the capability of changing the customer name information for a customer. According to an embodiment of the present invention, if the customer has a pending order, an order may be cancelled until it acquires the status "INSTALLATION COMPLETE," but no changes other than rescheduling installation are permitted until the order is completed. The DPOM system 200 will create a new PON. The request for changing the customer name typically is based on a request by the customer. Since rescheduling a pending order only impacts one order record, the DPOM system 200 allows the user to search for the order record that requires rescheduling. The record can be found by locating the customer associated with the order.

Referring again to FIG. 2, inquiries module 230 permits a user to request information from the DPOM system 200 through user interface 205. In an embodiment of the present invention, the DPOM system 200 supports the following inquiries:

Reports
Revision tracking
Telephone Number Status
Customer Status
Custom Inquiry The DPOM system 200 supports pre-defined reports that can be accessed by user authorized to received them. In an embodiment, the DPOM system 200 supports the production of reports in HTML and Excel formats.

The following are exemplary pre-defined reports. However the invention is not so limited. As will be apparent to those skilled in the art of the present invention, other reports may be pre-defined without departing from the scope of the present invention.

Current Customers. This report provides a list of all current VoIP customers. This listing can filter alphabetically by Customer Name or numerically by Telephone Number (TN). The Desired Due Date (DDD) of the customer in-service date is also shown on the report.

Available TNs. This report provides a list of all current available TNs. This listing can be filtered alphabetically by Rate Center or numerically by TN by selecting the arrow adjacent to Rate Center or TN.

Unavailable TNs. This report provides a list of all current unavailable TNs. This listing can be filtered alphabetically by Rate Center or numerically by TN by selecting the arrow adjacent to Rate Center or TN.

Phone Number Status. The Phone Number Status page is used to see if a phone number is assigned to a VoIP customer or not, and also whether it is a ported number or a native number.

Customer Status. The Customer Status report provides information about the status of a customer order.

Referring again to FIG. 2, the customer order management module 225 permits an appropriately authorized user to manage orders previously entered. According to an embodiment of the present invention, an original order obtains customer address information from the incumbent billing system (as captured by the incumbent billing system interface 210). A CLEC uses a Master Street Address Guide (MSAG) datastore 270 to validate this address information for 911 purposes. In another embodiment of the present invention, the DPOM Datastore 218 parses and displays customer address information in MSAG format so that the CLEC can validate the address based on the actual MSAG database.

After an address in DPOM is marked as MSAG validated, DPOM system 200 does not accept updates to that address from the billing system because it is now the "official" address in DPOM. If a CLEC cannot validate an address, the customer order management module 225 is used to revise the customer address information in the DPOM datastore. In addition, the following management tasks can be performed by the DPOM system 200 using the customer order management module 225:

Edit MSAG Information. Appropriately authorized users can make corrections to the data held in the DPOM datastore 218. In an embodiment of the present invention, data from the incumbent billing system is used to initialize this information. In this embodiment, a CLEC user will confirm the information is correct, advise the CSR user that the information is incorrect, or, if permissions have been granted to the CLEC user, make changes directly to the information held in the MSAG datastore 225. If changes are required to a MSAG Address record, and a pending order exists for the customer, then a change will also be made to the pending order.

Cancel Order. In an embodiment of the present invention, an order can be cancelled if is in the Submitted, CLEC Validated, or CLEC Invalidated state. In yet another embodiment of the present invention, change orders cannot be cancelled, regardless of their state. The DPOM system 200 will present the user with a summary of all orders that are in the submitted, CLEC validated, or CLEC invalidated state.

Order Status. While other order management pages filter out orders that are in states in which a user is not authorized to act on the order, the order status page shows all orders and their summary counts, no matter what state they are in. The order status page provides the user with a read-only view of the order.

Telephone number (TN) datastore 235 is accessed by DPOM system 200 to facilitate TN assignments, TN aging, and TN porting. Hardware configuration module 240 provides DPOM system 200 means to controls the configuration of a softswitch 245 that routes telephone calls to and from the customer and the configuration of a voicemail server 250.

CLEC access device 255 interacts with LEC datastore 260, CNAM datastore 265, MSAG/E911 datastore 270, and LIDB datastore 275.

The LEC datastore 260 comprises customer directory information based on telephone number.

The CNAM datastore 265 retains customer name information for displaying the calling party's name to a called party subscribing to caller ID service. Note that the CNAM data maintained by the ILEC is used for calls that are "off-network" relative to the cable operator's system. Caller id services provided by the cable operator to on-net calls may access a different datastore.

The MSAG/E911 datastore 270 is a master street address guide accessible to the CLEC access device 255. The CLEC uses data from this source to confirm the address of the customer that is provided in the service order.

The LIDB datastore 275 retains information associated with the telephone number of the subscriber. By way of illustration and not as a limitation, an order may note that the subscriber has a disability that requires special handling of operator-assisted and/or directory assistance calls. An order may also specify that the end user's billing name and address is not available to anyone other than the current local service provider, based on the end user's request. These "rules" are associated with the subscriber's telephone number and store in the LIDB datastore 275.

FIG. 3 illustrates a flow of information among the users of the DPOM system according to an embodiment of the present invention. Customer, order, and provisioning information is accessible to a customer service representative (CSR) of the cable operator, a voice-provisioning specialist (VPS) of a local exchange carrier (CLEC), and an installation technician based on permissions granted by a DPOM system administrator. The shared information allows a CSR to manage orders for VoIP services and to coordinate installation and provisioning so as to reduce the time to complete an order and use installation resources efficiently.

Referring to FIG. 3, a functional view of the process of by which VoIP service is provisioned is illustrated according to an embodiment of the present invention. An order is submitted from a CSR access device 300 to the DPOM system and receives the status "SUBMITTED." Receipt of the order is acknowledged by the CLEC access device 305 and the order status is changed to "CLEC PROCESSING." The submitted order is received by a CLEC access device also using the DPOM system and the order is evaluated 310. The CLEC access device responds by identifying the order as either valid 320 or not valid 315 with problems noted.

The CLEC is responsible for viewing all orders in the submitted status and moving them to either the CLEC Valid or CLEC Invalid status. For new orders for, the CLEC validates the subscriber address. The CLEC also performs the telecom industry provisioning before validating the order. In an embodiment of the present invention, a CLEC uses the Master Street Address Guide (MSAG) to validate address information for 911 purposes. In another embodiment of the present invention, the DPOM system parses and displays customer address information in MSAG format so that the CLEC can validate the address based on the actual MSAG database. If the CLEC validates the address, the CLEC then reviews Line Service Request (LSR) information for the data needed by the CLEC's trading partners to fulfill the service components ordered by the customer. If a trading partner rejects an order for a reason that the CLEC cannot resolve, the CLEC marks the order invalid. If all transactions are confirmed, the CLEC marks the order as valid.

In an embodiment of the present invention, communications between the CSR and the CLEC are conveyed over the DPOM system uses a fixed message format to convey transactions relating to an order. In an exemplary embodiment, messages use different XML schemas but declare a common schema that each message references. Each transaction will contain a Header. The header contains the party sending the transaction (Source), the party receiving the transaction (Destination), and the transaction type that maps directly to the schema (Transaction Type).

Table A is a list of transactions initiated by a CSR access device that are sent to the CLEC access device:

TABLE A

| Transaction Message Content | Message Description |
| --- | --- |
| New Connect | Requests new voice service to porting over or existing customers. |
| Supplement | Changes to the New Connect request for new voice service to porting over or existing customers. The possible supplements include Cancel, Reschedule, and Pending Order Changes. |
| Install Complete | Notifies CLEC of VoIP service successfully provisioned. |

TABLE A-continued

| Transaction Message Content | Message Description |
| --- | --- |
| CSR Query Request | This will query the CLECs to retrieve customer feature and directory listing information. This request will only be sent on New Connect Port-Ins. |

Table B is a list of transactions initiated by a CLEC access device and sent to a CSR access device:

TABLE B

| Transaction Message Content | Message Description |
| --- | --- |
| Confirmation | Notifies the DPOM system that the voice service has been confirmed and will likely be completed successfully by the due date request. |
| Jeopardy | Notifies DPOM system that the voice service will not meet the due date requested or a host of other reasons. The order may need to be supplement to complete order flow-through. |
| Reject | Notifies DPOM system that the LSR request does not have accurate information to complete the order. The order will need to be supplement to complete order flow-through. |
| Complete | Notifies DPOM system that the voice service has been successfully completed by the due date request. |
| CSR Query Response | The query response will provide DPOM system with the customer's feature and directory listing information only on Port-Ins. |

An order identified as not valid receives a status of "CLEC INVALID." An order with the status CLEC INVALID is returned to the CSR and resubmitted to the DPOM system (at which time the status is upgraded to SUBMITTED) with corrected information. A valid order receives a status of "CLEC VALID."

An installation technician access device determines that an order having a status of CLEC VALID is pending and prompts an installation technician to provision the subscriber 325 according to the order. For new orders, the installation technician installs the MTA at the subscriber's location. Using the DPOM system, a CSR or installation technician activates services for the customer by assigning the MTA MAC address and programming the softswitch. A determination is made that the digital phone service is working properly, and the installation technician reports the completion of the order to the DPOM system 330. The status of the order is changed to "INSTALLATION COMPLETED."

The CLEC access device determines that an order has been provisioned and confirms that the service is operative 335 according to the order.

The CLEC access device then upgrades the status of the order to "COMPLETED" 340. The completed status is reported to CSR access device 345.

Figure 4A:
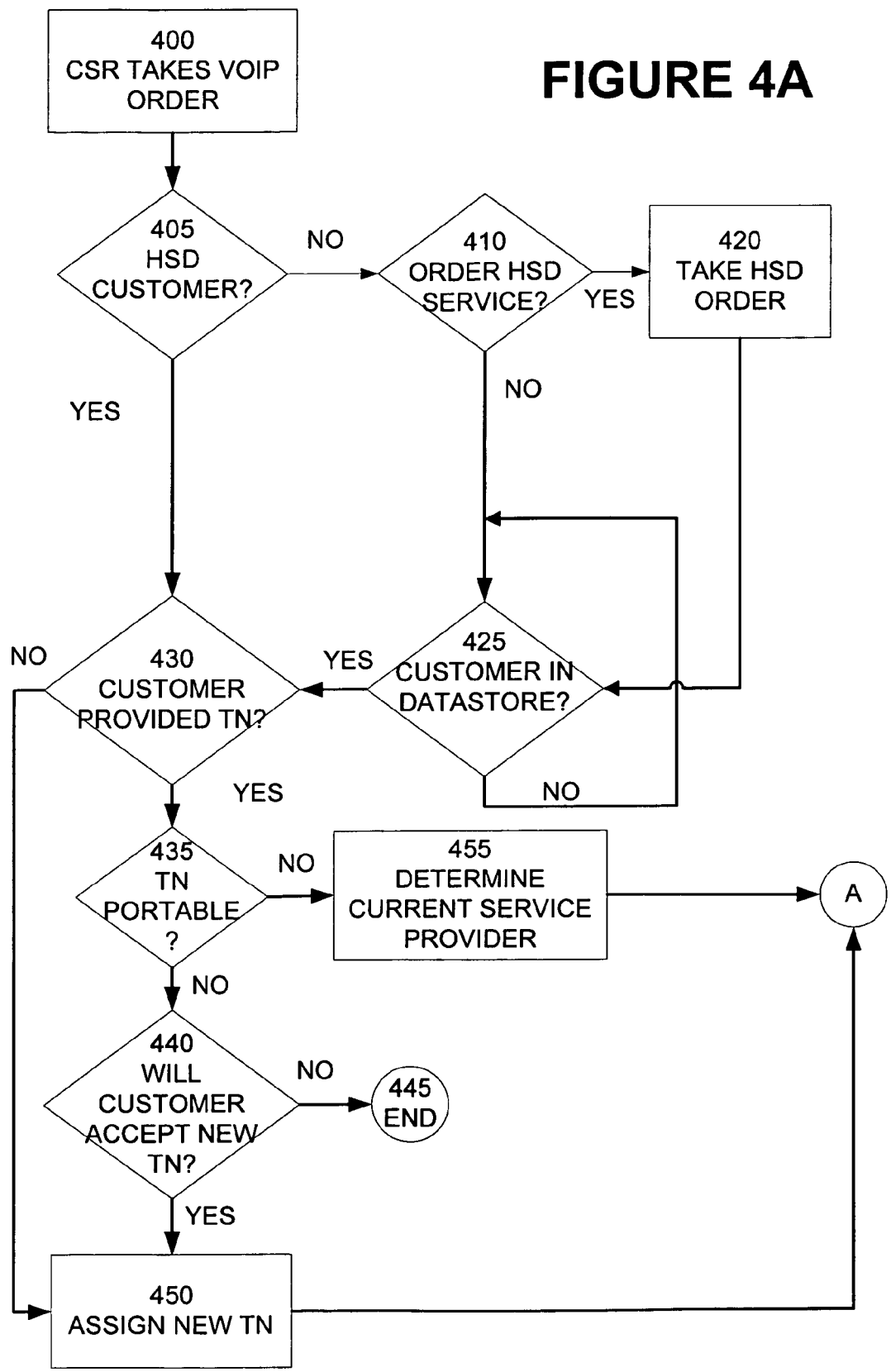
FIGS. 4A and 4B illustrate the flow of a service order for VoIP service through a DPOM system according to an embodiment of the present invention.
Figure 4B:
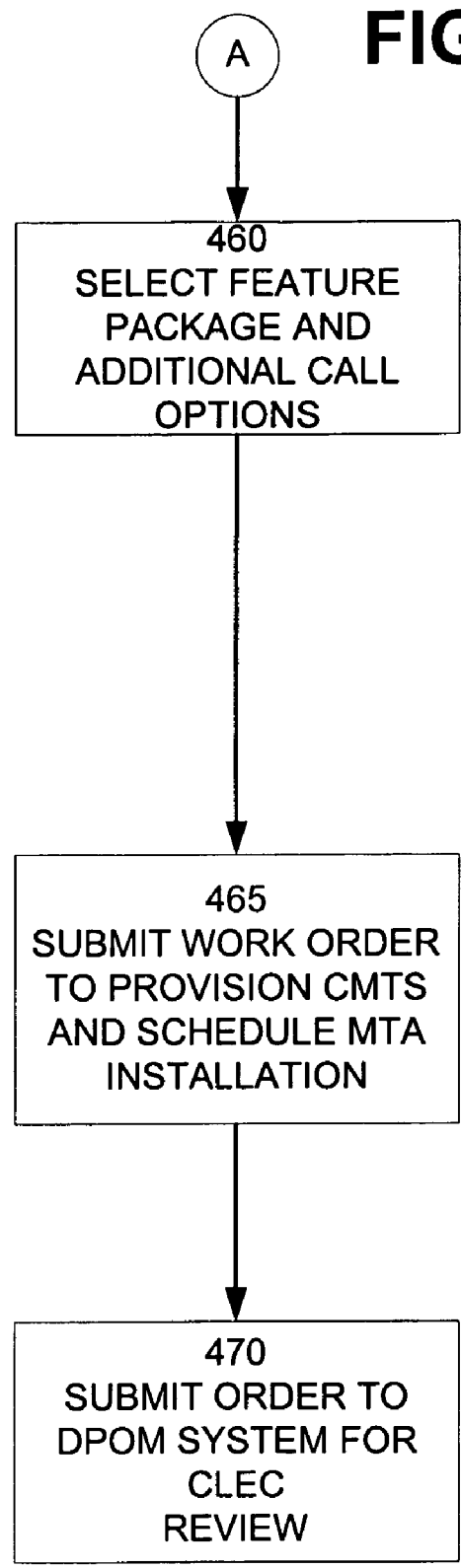

FIGS. 4A and 4B illustrate the flow of a service order for VoIP service through the DPOM system according to an embodiment of the present invention. Referring to FIG. 4A, a CSR takes a customer order 400 for VoIP service. A determination is made whether the prospective customer is already receiving HSD services 405 from the cable operator. If the prospective VoIP customer is not a current HSD customer, the CSR determines if the prospective customer wants to subscribe to both HSD and VoIP services 410. If the prospective customer chooses to subscribe to both services, the CSR takes the HSD order 420 and waits for the prospective customer to be added to the customer datastore 425. If the prospective customer does not want HSD service, the process waits for the prospective customer to be added to the customer datastore 425. If the prospective customer already has HSD service or if the customer has been added to the customer datastore, the process continues with the selection of a telephone number 430.

A prospective customer may wish to continue to use a telephone number previously assigned (that is, to "port" an existing number to the cable operator) or to obtain a new number. Because some telephone numbers cannot be ported, a prospective customer may be required to obtain a new telephone number.

In still another embodiment of the present invention, a customer may choose an InterLATA, IntraLATA, and international long distance carriers, may designate that one or more PICs be frozen (unchangeable without customer approval), and select from optional services including call privacy (calling name not delivered to called party), and directory listing options.

An installation date is selected and a work order is submitted 465 to set the softswitch provisioning and MTA installation processes in motion.

An exemplary set of order components are set forth in Table 3:

TABLE 3

| Field | Description |
|---|---|
| Install Date/Time | Facilitates coordination of the PSTN work with the installation technician home visit to install the modem and/or MTA |
| Feature Package | Pre-defined set of service features. |
| Inbound Call Blocking | Select the type of call blocking the customer wants for inbound calls (if they want to block calls). If the customer chooses, they can block third party calls, collect calls, or both. |
| Outbound Call Blocking | Select the type of call blocking the customer wants for outbound calls (if they want to block calls). If the customer chooses, the can block 900/976 calls, international calls or both. |
| InterLATA PIC, IntraLATA PIC, Intl Long Distance Carrier | These fields are applicable to Local phone feature packages only and allow the customer to choose their InterLATA (calls outside of the customer's area code), IntraLATA (long distance calls within the customer's area code) and International long distance carriers. |
| Caller ID Name | Enter the customer's name as they want it to appear on Caller ID units (up to 15 alpha-characters in upper case only). |
| Caller ID Privacy | Select whether the customer wants to display their name on caller ID units. Select "Yes" if the customer does not want their name to appear on caller ID units (privacy is turned on). Select "No" if the customer does want their name to appear on caller ID units (privacy is turned off). |

The DPOM system verifies the portability of a telephone number. A determination is made whether a customer has a telephone number 430 and whether the existing telephone number can be ported 435. If the number is not portable, a determination is made whether the customer will accept a new telephone number 440. If the customer does not want a new telephone number, the process ends 445. If the customer will accept a new telephone number, the CSR is provided a number from a list of available numbers 450. The telephone number list is maintained in the TN datastore (240—see FIG. 2). If the customer's telephone number is portable, the CSR determines the current service provider servicing the telephone number 455.

Referring to FIG. 4B, following the assignment of a new telephone number, or the porting of an existing telephone number, the customer selects a feature package and additional call options 460. A feature package comprises call options that have been bundled together. Additional call options are options not included within the selected feature package. A feature package is a standard package of call options. By way of illustration and not as a limitation, in an embodiment of the present invention, a basic feature package comprises Digital Phone Service, Call Waiting, Caller ID, Caller ID with Call Waiting, and a long distance carrier selected by the cable operator. In another embodiment of the present invention, an enhance feature package comprises Digital Phone, Voice Mail, Call Waiting, Caller ID, Caller ID with Call Waiting, Call Forwarding, One-digit Speed Dialing, Anonymous Caller Reject/Accept, and a long distance carrier selected by the cable operator.

The order is then saved to the DPOM system for validation by a CLEC 470 (see FIG. 3). The order status is "SUBMITTED."

Orders that have been submitted are processed by the DPOM system depending on the current status and the outcome desired. For example, an order that has the status CLEC INVALID may be corrected and resubmitted. An order that has not obtained the status INSTALLATION COMPLETE may be cancelled. An order that has acquired the status CLEC VALID is ready for activation on the softswitch used to provide digital phone service to the customer. In an embodiment of the present invention, the DPOM system uses an order status in combination with the permissions of a user to direct that user to process an order in a specific way. By way of illustration and not as a limitation, when an installation technician accesses an order having the status CLEC VALID, the installation technician access device is prompted for the MTA MAC address. The MTA MAC address entered in response to the prompt is then sent by the DPOM system to the softwswitch.

In another embodiment of the present invention, the DPOM system processes cancel order requests conditionally. That is, a cancel order request submitted by a CSR is held open until the cancellation is confirmed by a CLEC. In this embodiment, the DPOM system prevents a new order for the same customer being submitted until the conditionally cancelled order is confirmed by the CLEC and the order status is CANCELLED. A new, change number, disconnect or transfer order having the status CANCELLED is further processed by the DPOM system by automatically reprogramming the softswitch as required.

In yet another embodiment of the present invention, the DPOM system processes a change telephone number order by creating two orders. The first order is a disconnect order for the first number and the second is new order number for the new number. In this embodiment, the CLEC reviews both the disconnect and the connect orders associated with the change number order and updates them to CLEC Valid. The CSR first accesses the disconnect order and disconnects the MTA for the old phone number. The CSR updates the disconnect order status to INSTALLATION COMPLETED. After disconnecting the modem for the old number, the CSR can connect the modem for the new order by completing the connect modem process. After verifying the new number is functioning properly, the CSR updates the new order status to INSTALLATION COMPLETED. After the change number orders are updated to INSTALLATION COMPLETED, the CSR closes the order in the billing system and the CLEC updates the public databases with the new number. After the databases are updated, the CLEC updates the status of both orders to COMPLETED, which closes the orders in DPOM. As a safeguard, a request to cancel one of these orders causes the DPOM system to automatically updates the related order to CANCEL REQUEST status also. The CLEC then updates the status of both orders to CANCEL COMPLETED.

A system and method for provisioning VoIP services in a customer care environment has been disclosed. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A digital phone order management (DPOM) system comprising:
a customer order entry module for receiving a customer order comprising customer ordering information for digital phone service from a customer of a cable system operator;
a user interface, wherein the user interface is configured to:
provide access to the DPOM system to a customer service representative (CSR) user via a CSR user access device, wherein the CSR user access device is configured to:
obtain the customer order information from the customer order entry module;
process the order; and
submit the CSR processed order and the customer order information to an order management module, wherein the order management module is configured to:
receive the CSR processed order and the customer order information from the CSR user access device; and
associate a customer order status indicative of a submitted status with the CSR processed order and the customer ordering information;
provide access to the DPOM system to a competitive local exchange carrier (CLEC) user via a CLEC user access device, wherein the CLEC access device is configured to:
determine whether the CSR processed order having the customer order status submitted is pending;
acquire the CSR processed order from the order management module when the CSR processed order having the customer order status submitted is pending;
acknowledge acquisition of the CSR processed order to the order management module;
change the customer order status from the submitted status to a customer order status indicative of a CLEC processing status of the CSR processed order and report the changed status to the order management module;
validate the CLEC processed order;
change the customer order status from the CLEC processing status to a customer order status indicative of a validated status when the CLEC processed order is validated and report the changed status to the order management module; and
change the customer order status from the CLEC processing status to a customer order status indicative of a not validated status when the CLEC processed order is not validated and report the changed status to the order management module; and
provide access to the DPOM system to an installation technician user via an installation technician user access device, wherein the technician user access device is configured to:
determine whether the CLEC processed order having the status of CLEC validated is pending; and
issue an instruction to provision the customer according to the validated CLEC processed order when the CLEC processed order having the status of CLEC validated is pending.

2. The DPOM system of claim 1, wherein the order entry module is further configured to:
determine whether the customer is receiving high speed data (HSD) service from the cable system operator;
determine whether the customer desires HSD service when the customer is not receiving HSD service; and
enter the order for both digital phone service and HSD service for the customer when the customer desires HSD service.

3. The DPOM system of claim 1, wherein the order entry module is further configured to:
receive a telephone number associated with the customer;
determine whether the telephone number is portable;
port the telephone number to the digital phone service when the telephone number is portable; and
assign the customer a new telephone number when the telephone number is not portable.

4. The DPOM system of claim 1, wherein the order entry module is further configured to:
receive customer information relating to the customer from an incumbent billing system;
evaluate the customer information in view of the customer order; and
identify customer premises equipment (CPE) to be installed at a customer location.

5. The DPOM system of claim 4, wherein the CPE comprises a media terminal adapter.

6. The DPOM system of claim 4, wherein the CPE comprises a cable modem and a media terminal adapter.

7. The DPOM system of claim 4, wherein the order management module is further configured to:
receive a cancellation request to a pending customer order;
determine whether the customer order status reflects completion of installation of the CPE;
reject the cancellation request when the customer order status reflects completion of the CPE;
when the customer order status does not reflect completion of the CPE, then:
submit the cancellation request to the CLEC user via the CLEC user access device;
receive confirmation from the CLEC user access device that the cancellation request is confirmed;
change the customer order status to reflect cancellation of the customer order;
determine whether the softswitch comprises a record associated with the cancelled customer order; and
change the record to reflect cancellation of the customer order when the softswitch comprises the record associated with the cancelled customer order.

8. The DPOM system of claim 1, wherein the order entry module is further configured to:
receive customer information relating to the customer from an incumbent billing system;
evaluate the customer information in view of the customer order; and
assign the customer order to a rate center for fulfillment of the customer order.

9. The DPOM system of claim 1, wherein the DPOM system further comprises a hardware configuration module configured to:
receive a MAC address of a media terminal adapter associated with the customer; and
configure a softswitch with the MAC address of the media terminal adapter to provide digital telephone service to the customer.

10. The DPOM system of claim 1, wherein the order management module is further configured to:
receive a request to change an existing telephone number associated with the customer;
create a first order to disconnect the existing telephone number and a second order to connect a new telephone number;
send the first and second orders to the CLEC user via the CLEC user access device;
receive from the CLEC user access device validation of the first and second orders; and
update a softswitch to associate the new number with the customer.

11. The DPOM system of claim 1, wherein the technician user access device is further configured to issue an installation complete notification to the order management module when the customer has been provisioned according to the validated CLEC processed order and wherein the order management module is further configured to associate a customer order status indicative of a completion of installation status with the CLEC processed order upon receipt of the installation complete notification.

12. The DPOM system of claim 11, wherein the CLEC access device is further configured to:
determine whether the CLEC validated order having the customer order status "installation completed" is pending;
acquire the CLEC validated order from the order management module when the CLEC processed order having the customer order status installation completed is pending;
determine that the digital phone service is operative according to the CLEC validated order; and
change the customer order status to a customer order status indicative of a testing successful status when the digital phone service is operative and report the changed status to the order management module.

13. A method for managing orders for digital telephone service comprising:
receiving a customer order comprising customer ordering information for digital telephone service for a customer from a customer order entry module;
processing the customer order and the customer ordering information;
submitting the CSR processed order and the customer order information to an order management module;
receiving the CSR processed order and the customer order information from the CSR user access device at the order management module;
associating at the order management module a customer order status indicative of a submitted status with the CSR processed order and the customer ordering information;
determine at a CLEC access device whether the CSR processed order having the customer order status submitted is pending; and
acquiring at the CLEC access device the CSR processed order from the order management module;
acknowledging at the CLEC access device the acquisition of the CSR processed order;
changing at the CLEC access device the customer order status from the submitted status to a customer order status indicative of CLEC processing of the CSR processed order;
validating at the CLEC access device the CLEC processed order;
changing at the CLEC access device the customer order status from the CLEC processing status to a customer order status indicative of a validated status when the CLEC processed order is validated; and
changing at the CLEC access device the customer order status from the CLEC processing status to a customer order status indicative of a not validated status when the CLEC processed order is not validated; and
determining at an installation technician user access device whether the CLEC processed order having the status of CLEC validated is pending; and
issuing an instruction from the installation user access device to provision the customer according to the valid CLEC processed order when the CLEC processed order having the status of CLEC validated is pending.

14. The method for managing orders for digital telephone service of claim 13, wherein processing the customer order comprises:
making a determination whether the customer is receiving high speed data (HSD) service from the cable system operator; and
making a determination whether the customer desires to obtain HSD service from the cable system operator when the customer is not receiving HSD service,; and
entering the order for both digital telephone service and HSD service when the customer desires to obtain HSD service from the cable system operator.

15. The method for managing orders for digital telephone service of claim 13, wherein processing the order comprises:
receiving a telephone number associated with the customer;

making a determination whether the telephone number is portable;

porting the telephone number to the digital phone service when the telephone number is portable; and assigning the customer a new telephone number when the telephone number is not portable.

16. The method for managing orders for digital telephone service of claim 13, wherein processing the order comprises:

receiving customer information relating to the customer from an incumbent billing system;

evaluating the customer information in view of the customer order; and identifying customer premises equipment (CPE) to be installed at a customer location.

17. The method for managing orders for digital telephone service of claim 16, wherein the CPE comprises a media terminal adapter.

18. The method for managing orders for digital telephone service of claim 16, wherein the CPE comprises a cable modem and a media terminal adapter.

19. The method for managing orders for digital telephone service of claim 16, wherein method further comprises:

receiving a cancellation request to a pending customer order;

making a determination whether the customer order status reflects completion of installation of the CPE;

rejecting the cancellation request when the customer order status reflects completion of the CPE;

when the customer order status does not reflect completion of the CPE, then:

submitting the cancellation request to a competitive local exchange carrier (CLEC) user via a CLEC user access device;

receiving confirmation from the CLEC user that the cancellation request is confirmed;

changing the customer order status to reflect cancellation of the customer order;

making a determination whether the softswitch comprises a record associated with the cancelled customer order; and changing the record to reflect cancellation of the customer order when the softswitch comprises the record associated with the cancelled customer order.

20. The method for managing orders for digital telephone service of claim 13, wherein processing the order comprises:

receiving customer information relating to the customer from an incumbent billing system;

evaluating the customer information in view of the customer order; and assigning the customer order to a rate center for fulfillment of the customer order.

21. The method for managing orders for digital telephone service of claim 13, wherein processing the order comprises:

receiving a MAC address of a media terminal adapter associated with the customer; and configuring a softswitch with the MAC address of the media terminal adapter to provide digital telephone service to the customer.

22. The method for managing orders for digital telephone service of claim 13, wherein method further comprises:

receiving a request to change an existing telephone number associated with the customer;

creating a first order to disconnect the existing telephone number and a second order to connect a new telephone number;

sending the first and second orders to a competitive local exchange carrier (CLEC) user via a CLEC user access device;

receiving from the CLEC access device validation of the first and second orders; and updating a softswitch to associate the new number with the customer.

23. The method for managing orders for digital telephone service of claim 13 further comprising:

issuing an installation complete notification from the CLEC user access device to the order management module when the customer has been provisioned according to the validated CLEC processed order; and associating at the order management module a customer order status indicative of a completion of installation status with the CLEC processed order upon receipt of the installation complete notification.

24. The method for managing orders for digital telephone service of claim 23 further comprising:

determining at the CLEC access device whether the CLEC validated order having the customer order status installation completed is pending;

acquiring at CLEC access device the CLEC validated order from the order management module when the CLEC processed order having the customer order status installation completed is pending;

determining at the CLEC access device that the digital phone service is operative according to the CLEC validated order; and changing at the CLEC access device the customer order status to a customer order status indicative of a testing successful status when the digital phone service is operative and report the changed status to the order management module.

* * * * *